# UNITED STATES PATENT OFFICE.

EMIL E. NOVOTNY, OF LOGAN, PHILADELPHIA, PENNSYLVANIA, ASSIGNOR TO JOHN STOGDELL STOKES, OF PHILADELPHIA, PENNSYLVANIA.

METHOD OF MOLDING ARTICLES.

1,398,149.  Specification of Letters Patent.  Patented Nov. 22, 1921.

No Drawing.  Application filed January 21, 1921.  Serial No. 438,924.

*To all whom it may concern:*

Be it known that I, EMIL E. NOVOTNY, a citizen of the United States, and resident of Logan, Philadelphia, in the county of Philadelphia and State of Pennsylvania, have invented certain new and useful Improvements in Methods of Molding Articles, of which the following is a specification.

This invention relates to a process of forming articles from condensation products of the class known as synthetic resins, and has particular application to the utilization of reacted or infusible synthetic resinous materials for this purpose.

Certain of the synthetic resins of commerce, such as well known forms of phenolic condensation products are used in the molding of a great variety of articles, such as sound records, printing elements, insulating devices, etc. Heretofore, when one of these synthetic resins has been reacted or converted to its infusible or non-flowing, non-melting state, such a condition has been regarded as final or permanent in the sense that it has not been deemed practical to restore or reconvert the infusible mass to its fusible plastic form. Consequently, the reaction or conversion of the plastic resin from its fusible state to its infusible form has taken place in the mold or simultaneously with the formation of the article being manufactured. Such a procedure, however, is subject to certain disadvantages which are eliminated by my process of utilizing the infusible material at the time of molding. For instance, when molding with a plastic or fusible synthetic resin, there is a distinct tendency for the tacky, sticky fluid-like body to adhere to and interlock with the face or contacting portion of the mold, with the result that after the body has hardened or set to infusibility, it is difficult to separate or strip the article from the mold without damaging the face of such article, mold, or both. Furthermore, during the reaction of the material in the mold, water gas and ammonia gas are usually generated, and a portion of such gases are imprisoned in the mass of material, as it is impractical to eliminate or drive off all of the gases of the mold. The result is that such gases are liable to cause warping, blistering and distortion of the molded article, particularly should the article be stripped from the mold while still hot. In the molding of certain articles, such as phonograph records, it is desirable to remove the molded record from the matrix as soon as possible, in order to utilize the matrix for subsequent operations, but when working with fusible plastic and synthetic resins, I have found that the imprisonment of the gases within the body of the article and the removal of the latter before the gases have been condensed by the cooling of the article against the mold is liable to cause blisters or roughening the even surfaces on the record. And in the case of printing plates molded from such fusible material, the imprisonment of gases in the body of the plate renders the latter useless for the reproduction of stereotypes, because the application of heat during the stereotype process will cause the expansion of the imprisoned gases or consequent warping or buckling or distortion of the plate and the stereotype matrix being made therewith.

I have found that the above mentioned disadvantages incident to the use of the fusible, plastic material in molding may be entirely eliminated by utilizing a dry, non-flowing, non-molding infusible product. In using such a product in molding, I operate upon a material from which all gases and moisture have been removed, which is not subject to chemical reaction, and the shrinkage incident thereto, and which will no longer flow, melt or fuse, and consequently cannot adhere or stick to the mold or matrix. Furthermore, an article molded from this dry infusible synthetic resin will not be effected or distorted by the subsequent application of heat, as there are no imprisoned gases to cause blistering or warping. In the case of a flat article such as a printing plate or phonograph record, the avoidance of chemical reaction and consequent shrinkage insures the provision of an article of greater flatness and uniformity than is obtainable when using a fusible material in the molding operation.

Another advantage incident to the utilization of infusible synthetic resins in my process is that I am enabled to dispense with the use of metal-faced matrices or molds in molding such material. When using a fusible synthetic resin, I have found the metal-faced matrix or mold to be advantageous because the sticky or tacky substance will not adhere to the metal, but it will adhere to matrices which are formed with a hard surface or face of cementitious material. However, when I use a synthetic resin which has been reacted to its infusible state prior to the molding operation, I find, that owing to the absence of fluid-like characteristics and a stickiness, such infusible material will not adhere to the matrix, even though the latter be made of cementitious substance such as a hard and set phenolic condensation product. In some respects a matrix or mold having a face composed of a hard and set synthetic resin possesses advantages over a metal-faced matrix, for example, from the standpoint of cost, simplicity of manufacture and resistance to high temperatures and to pressure, as a matrix or mold having a face of hard synthetic resin is stronger than a metal-faced matrix and will not scratch or mar under rough handling or usage to the same degree.

One preferred manner of practising my process is as follows:

I take a mass or body of a selected fusible synthetic resin, such, for example, as a phenolic condensation product, and grind the same in a suitable mill such as a ball mill, to reduce the material to a powdery or comminuted condition. Any preferred synthetic resin may be used, such as a composition of phenol and formaldehyde; phenol and acetaldehyde; or phenol and furfural, a suitable catalyst being used with each combination. After this fusible mass has been thoroughly ground or powdered, I remove it from the mill and place it in an oven or heater where it is subjected to a suitable degree of temperature for a sufficient length of time to thoroughly eliminate or drive off all of the gases and moisture, and to cause such chemical reaction as will convert the mass from a fusible substance into a relatively hard, permanently infusible body. For example, the material may be subjected to a temperature of about 250° F. for a period of from two to six hours. When removed from the heater or oven, some of the mass of material will be found to have fused or slagged into loose, porous, lump-like form. The infusible mass is, therefore, preferably again subjected to the action of a grinding mill to break up the lumpy particles and to again reduce the entire mass to a fine powdery condition. At this stage, the material will be found to be dry or free from all moisture, and when reheated for a long period of time, under a relatively high temperature, will remain in the form of an inert powder. As a matter of fact, my experiments have shown that this infusible powder may be subjected to a heat of over 400° F. for a prolonged period without changing its powdery form or having the particles amalgamate, and furthermore, that such an infusible powder may be subjected to high pressure as in a cold hydraulic press, without changing the powdery form of the mass. However, I have discovered that if this infusible powder be subjected simultaneously to heat and pressure, as in a heated press, the particles of the mass will weld together to form a homogeneous body, such formation taking place without moisture or the liberation of gases, and without any flow of the material. In other words, the union of powder particles into a solid homogeneous mass under heat and pressure appears to partake of a nature of a welding action as contradistinguished from a union resulting from fusing or melting such as take place where a fusible synthetic resin is subjected to heat and pressure as during a molding operation.

After the infusible powder has been thus prepared, I select a suitable matrix for the molding of the desired shape or article, and cover the molding face section of the matrix with a layer of this infusible powder. The matrix may now be placed in a heated press and the latter closed, and the heat applied to a suitable temperature and for a sufficient length of time to cause the particles of the powdery layer to weld together into a hard homogeneous body which will of course assume the shape of the desired article as governed by the molding face of the matrix. Such molding of the article may be accomplished at a temperature of from 320 to 350° F., and applied for a period of from one to five minutes.

After the molding has been completed, the article may be stripped from the matrix without any difficulty, even though the molding face of the matrix be composed of a layer of a hard, set, synthetic resin. Where the angularities of the matrix are sharp and deep as in the case of a printing plate matrix, it will be found advantageous to brush the matrix with a thin film of graphite, prior to the application of the infusible powder.

In molding certain articles, such, for example, as a printing plate, it may be desirable to provide the plate with a backing during the molding operation. This may be done in numerous ways, as, for example, by impregnating a sheet of fiber with a fusible, synthetic resin, then subjecting the impregnated sheet to a heating or baking action to render the synthetic resin infusible, and to drive off the gases and moisture, and then applying this backing sheet to the layer of infusible powder on the face of the matrix. When subjected to heat and pressure, as above mentioned, to weld and mold the infusible powder, the backing sheet will unite with or adhere to the molded and welded layer of infusible synthetic resin and form an integral structure therewith. In some instances, it may be found advantageous to coat a face of the impregnated fiber sheet with a relatively thin film of liquid cementitious material, such, for example, as a synthetic resinous varnish, and then apply the face so coated in contact with the powder layer on the matrix, so that when the parts are united and welded under heat and pressure, the adherence of the face, formed from the welded powder, to the backing sheet will be increased. When such a varnish or adhesive layer is applied to the backing, the infusible powder layer may be sprinkled or sifted over or upon the film of varnish and the sheet thus formed placed against the matrix and molded in the manner above described. Preferably the varnish binding film is also hardened to a state of infusibility prior to the application of the sheet to the matrix or mold.

I have also found that by molding the article from the infusible synthetic resin, as above described, it is neither necessary nor desirable to cool a matrix while the molded article is still in the same, or after the molding operation, as ready and instant separation may be had while the matrix is still hot, this separation by reason of the fact that there has been no flow of the infusible material, and consequently no sticking of the molded article to its matrix.

I am aware of the fact that in some instances it has been proposed to provide a molding material in the nature of a synthetic resin, which has supposedly been reduced to a state of infusibility prior to molding. But in such instances the synthetic resin has been maintained in a condition of permanent thermoplasticity by adding as a constituent a plasticity agent or solid solvent, so that an article molded from such a composition might subsequently be reheated or softened or reconverted to a plastic state and again molded. But I have found that such a composition would be unsuitable for my purposes. For example, such a permanent thermoplastic material, containing the solid solvent, will, under a molding operation, stick or adhere to a matrix having a face composed of a hard, synthetic resinous material, so that the article cannot be separated from the matrix without the liability of injury. Furthermore, an article formed from such a permanent thermoplastic is not desirable for many purposes, such, for example, as manufacturing printing plates, because it will not withstand the heat and pressure which it would be necessary to use in reproducing a stereotype matrix or a synthetic resinous matrix from such a printing plate. A distinct advantage incident to the utilization of the infusible synthetic resin, as above described, is that discarded articles such as printing plates, phonograph records, and the like, made of permanently infusible synthetic resinous material, may be reclaimed by breaking up and regrinding, and the material thus provided can again be used in my process in making other articles. Heretofore, this has not been attainable, and permanently infusible articles, having outlived their usefulness, have been considered practically as a dead loss or used merely as filling material, similar to wood flour or other inert substances. Such reclaimed material I may use for making new articles instead of merely employing the material as a filler in combination with raw or fusible synthetic resin.

Inasmuch as the treatment of the infusible powder, during my molding operation is in the nature of a welding operation as contradistinguished from a heating or fusing operation, it is unnecessary to consume as much time in the manufacture of an article as is required where fusible material is employed, and consequently the output and production due to the availability of the molds is greatly increased.

What I claim is—

1. The herein described method of molding which comprises providing a body of powdered reacted infusible synthetic resin, and subjecting the same to heat and pressure against a matrix to weld the particles of the body into a homogeneous mass and to fashion the molded article therefrom.

2. The herein described method of molding an article which comprises providing a powdered body of non-plastic infusible synthetic resin, and subjecting the same to heat and pressure against a matrix to weld the powder particles of the body into a homogeneous mass and to fashion the molded article therefrom.

3. The herein described method of molding an article which comprises subjecting a fusible body of synthetic resinous material to heat, to eliminate gases from the body and to convert the latter into a reacted infusible state, then comminuting the infusible body, to reduce the same to a powdered condition, then applying the powdered body to a matrix and subjecting the same to heat and pressure to weld the particles of the powdered body into a homogeneous mass and to fashion the molded article therefrom.

4. The herein described method of molding an article which comprises subjecting a backing sheet and layer of non-plastic, infusible, synthetic resin to heat and pressure against a matrix, with said layer in contact with the molding face of the matrix to weld the particles of the layer into a homogeneous mass, to unite said mass to the backing sheet and to fashion the molded article.

5. The herein described method of molding an article which comprises the impregnating of a porous backing with a fusible synthetic resin, subjecting the same to heat to eliminate moisture and gases from the synthetic resin, and to convert the latter to an infusible state, then applying a layer of non-plastic, infusible powdery synthetic resin to the molding face of a matrix, imposing the impregnated backing sheet upon said powdery layer, then subjecting the same to heat and pressure to weld the powdery layer into a homogeneous mass, to unite the same to the backing sheet and to fashion the molded article therefrom.

Signed at Philadelphia, in the county of Philadelphia and State of Pennsylvania, this 4th day of January, A. D. 1921.

EMIL E. NOVOTNY.